United States Patent [19]

Mertens

[11] Patent Number: 4,635,060
[45] Date of Patent: Jan. 6, 1987

[54] COHERENT-ON-RECEIVE RADAR WITH PREPHASE CORRECTION CIRCUIT

[75] Inventor: Lawrence E. Mertens, Palm Bay, Fla.

[73] Assignee: RCA Corporation, Princeton, N.J.

[21] Appl. No.: 617,559

[22] Filed: Jun. 5, 1984

[51] Int. Cl.$^4$ .............................. G01S 7/30; G01S 7/40
[52] U.S. Cl. .................................... 342/194; 342/173
[58] Field of Search .............. 343/17.7, 17.1 R, 5 NQ, 343/9

[56] References Cited

U.S. PATENT DOCUMENTS

| | | | |
|---|---|---|---|
| 3,295,127 | 12/1966 | Kross | 343/7 A |
| 3,419,814 | 12/1968 | Graves et al. | 331/2 |
| 3,631,351 | 12/1971 | Paine | 328/133 |
| 4,095,224 | 6/1978 | Dounce et al. | 343/5 NQ X |
| 4,143,376 | 3/1979 | Jezo | 343/6 R X |

Primary Examiner—Thomas H. Tarcza
Assistant Examiner—Mark Hellner
Attorney, Agent, or Firm—Joseph S. Tripoli; Robert L. Troike; Raymond E. Smiley

[57] ABSTRACT

A coherent-on-receive radar for determining the velocity of and distance to targets. The radar conventionally includes a transmitter of non-coherent pulses, an antenna for transmitting the pulses into space and receiving return signals from targets upon which the pulses impinge, a local oscillator and a phase detecting circuit responsive to the return signal and local oscillator signal for determining the phase difference between the respective signals. In accordance with the invention the radar includes a sample and hold circuit used in conjunction with the phase detecting circuit, prior to the receipt of any return signal, for storing for each transmitted pulse its phase difference from the local oscillator signal phase. The stored signal is used to modify the phase of one or the other of return signals sent to the phase detector or local oscillator signal as sent to the phase detector so the detector in effect detects the phase difference between each transmitted pulse and the return signals resulting therefrom.

13 Claims, 5 Drawing Figures

COHERENT-ON-RECEIVE RADAR WITH PREPHASE CORRECTION CIRCUIT

The present invention is concerned with a distance and velocity detecting radar system, and more particularly, with such a system which operates in a coherent-on-receive manner.

BACKGROUND OF THE INVENTION

In radar systems designed for measuring the velocity of (rate of movement toward or away from the radar) and distance to targets of interest, the best system in terms of performance is the fully coherent system. In a fully coherent system periodic pulses are transmitted through space, which pulses are in-phase relative to a reference standard, and therefore in-phase relative to one another. The fully coherent system exacts a penalty relative to other systems in terms of cost, size and weight. A second radar system, termed coherent-on-receive is one in which transmitted pulses vary in phase from one another. A sample of each transmitted pulse is utilized in signal processing equipment associated with the radar receiver to compensate for the phase difference from transmitted pulse to transmitted pulse.

Unfortunately, it has been found that the compensation is far from ideal such that considerable pulse to pulse error remains. It is common to use a doppler (high pass) filter to filter out low frequency signals related to stationary and very slow moving targets (termed clutter) leaving high frequency signals related to faster moving targets of interest. (It should be understood that, depending on the use to which the radar is put, certain slow moving targets may be the targets of interest and the fast moving signals may be considered clutter.)

The above-described pulse-to-pulse phase error which remains is largely of sufficiently high frequency to pass through the doppler filter. Furthermore, the high frequency components passing through the filter may be greater in amplitude than the signals representing the targets of interest.

SUMMARY OF INVENTION

In a coherent-on-receive radar system including means for producing periodic ratio frequency (rf) signal pulses, the phase of which varies from pulse to pulse, means for transmitting the pulses into space and receiving return signals from targets upon which the transmitted pulses impinge, means producing an rf signal having a reference phase, means responsive to the reference phase signal and received signals for producing signals having a parameter representing the phase difference between the phase of the received signal and reference phase signal, the improvement comprises the phase difference measuring means being responsive to each transmitted pulse and the reference signal at a time following the production of each pulse and before any return signals from any targets of interest are received for producing a signal having a parameter representing the phase difference between the phase of the transmitted pulse and the reference phase signal. A means is included for storing the signal having a parameter representing the phase difference of the transmitted pulse and the reference phase signal. A means is responsive to the stored signal for altering the phase of one of the returned signal and reference phase signal applied to the phase difference measuring means, whereby it produces essentially the phase difference between the reference phase signal and return signal.

DETAILED DESCRIPTION

The type of coherent-on-receive radar about to be described is one which is suitable for operation in a tethered balloon for use in determining the distance to and velocity of relatively fast moving targets such as aircraft while rejecting slow moving or non-moving targets such as, for example, buildings, roads, fields, boats, rustling trees or sea waves. As such the radar must be both light weight and rugged to be able to operate in the tethered balloon and sufficiently accurate to properly identify targets of interest while rejecting targets not of interest (termed clutter).

Figure 1:
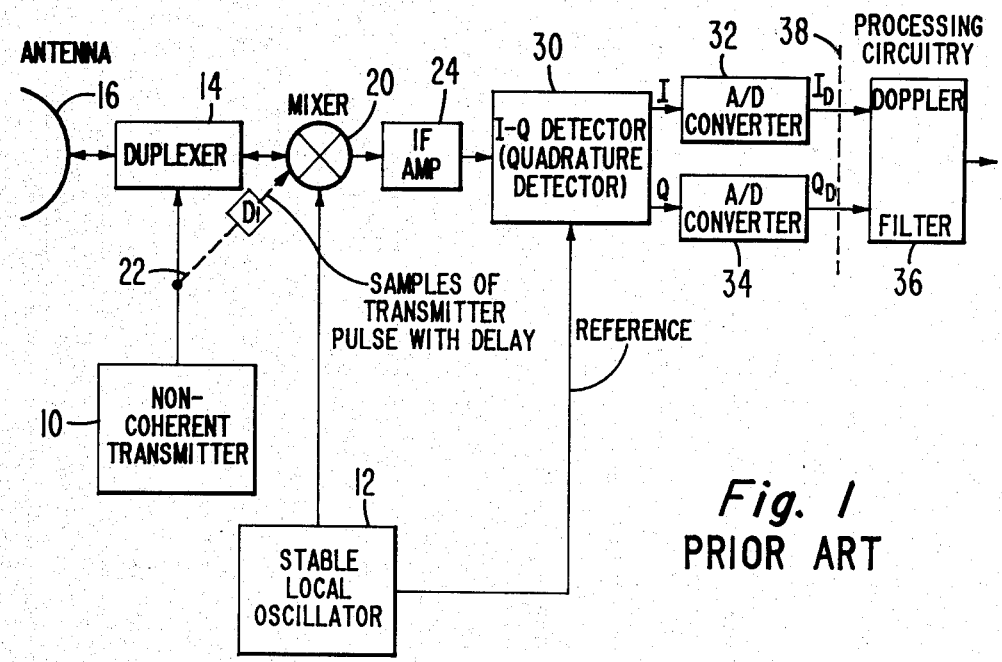
FIG. 1 is a coherent-on-receive radar in block diagram form in accordance with the prior art.

FIG. 1 to which attention is now directed illustrates a prior art coherent-on-receive radar of the type that is to be improved on in the present invention.

With reference to FIG. 1 a non-coherent transmitter 10 of conventional design produces periodic pulses of frequency in the microwave frequency range such as, for example, 1 to 10 gigahertz (GHz). The pulses, for example, may be of one microsecond duration with a period (pulse-to-pulse spacing) of two milliseconds. A stable local oscillator 12, also of conventional design, produces two phase coherent continuous frequency signals, the first applied to mixer 20, of frequency different than that produced by transmitter 10 by a specified amount such as a typical intermediate frequency (IF) value of 30 megahertz (MHz) and a second frequency at IF applied to detector 30. Local oscillator 12 also acts as a phase reference. The phase of successive pulses produced by transmitter 10 are not uniform relative to the phase of local oscillator 12 due to the nature of a non-coherent transmitter. Transmitter 10 is coupled to a duplexer 14. Duplexer 14 is connected to a narrow beam rotating transmit/receive antenna 16 and to a mixer 20 each of conventional design. Duplexer 14 protects mixer 20 and the following radar receive circuitry from burnout or damage during transmission. Duplexer 14 routes return signals at antenna 16 to mixer 20. Antenna 16 transmits pulses produced by transmitter 10 into space and, for each transmitted pulse receives back return pulses from targets (if any) impinged by the transmitted pulses.

Each return pulse is delayed in time from the associated transmitted pulse by an amount proportional to the distance of the target from the antenna. The frequency of the transmitted pulse is also Doppler shifted by a small amount proportional to the radial velocity of the target. As indicated by dashed line 22 including box $D_1$ a delayed sample of each pulse produced by transmitter 10 is coupled to mixer 20. The delay is chosen to be greater than the pulse width, one microsecond, for example, and less than the time for a return pulse from the nearest target of interest. The reason for the delay will be described hereinafter.

Intermediate frequency (IF) amplifier 24 is connected at its input to the output of mixer 20 and at its output to the input of what is termed an I-Q detector or quadrature detector 30. The letters I and Q stand for in-phase and quadrature. Detector 30 also receives a phase reference signal from local oscillator 12 for providing a phase reference to detector 30. The purpose of I-Q detector 30 is to provide a signal having a parameter which represents the difference in phase between the signal received from amplifier 24 and the signal received from oscillator 12. The signal from amplifier 24 at any point in time is either the return signal transmitted back to antenna 16 from targets illuminated by the signal pulses produced by antenna 16 or the sample of the transmitted signal (or no signal). The signals produced by I-Q detector 30 at the I and Q outputs thereof are the rectangular coordinates representative of the phase difference between the two input signals applied to detector 30 and include an ampltiude component. That is, the phase difference between the two input signals is equal to arctan $(Q \div I)$.

The I and Q outputs of detector 30 are connected to inputs of analog-to-digital (A/D) converters 32 and 34, respectively. The A/D converter outputs labeled $I_D$ and $Q_D$ respectively are coupled to digital processing circuitry including digital doppler filter 36 and other components to the right of dashed line 38 of conventional design and not of interest to the present invention except in general terms.

In a tethered balloon radar of the type previously mentioned by way of example, converters 32 and 34 are connected to down link transmitters (not shown) and all processing circuitry, including filter 36, is ground based. Such an arrangement is purely exemplary and not necessary for the realization of the invention.

The purpose of a doppler (high pass) filter is to remove phase change components of received pulses due to slow moving objects and hardware inaccuracies. One principal source of hardware inaccuracy is the I-Q detector which produces a phase error that is undesirably a function of measured phase difference. A/D converters 32 and 34 are also sources of errors.

Figure 2:
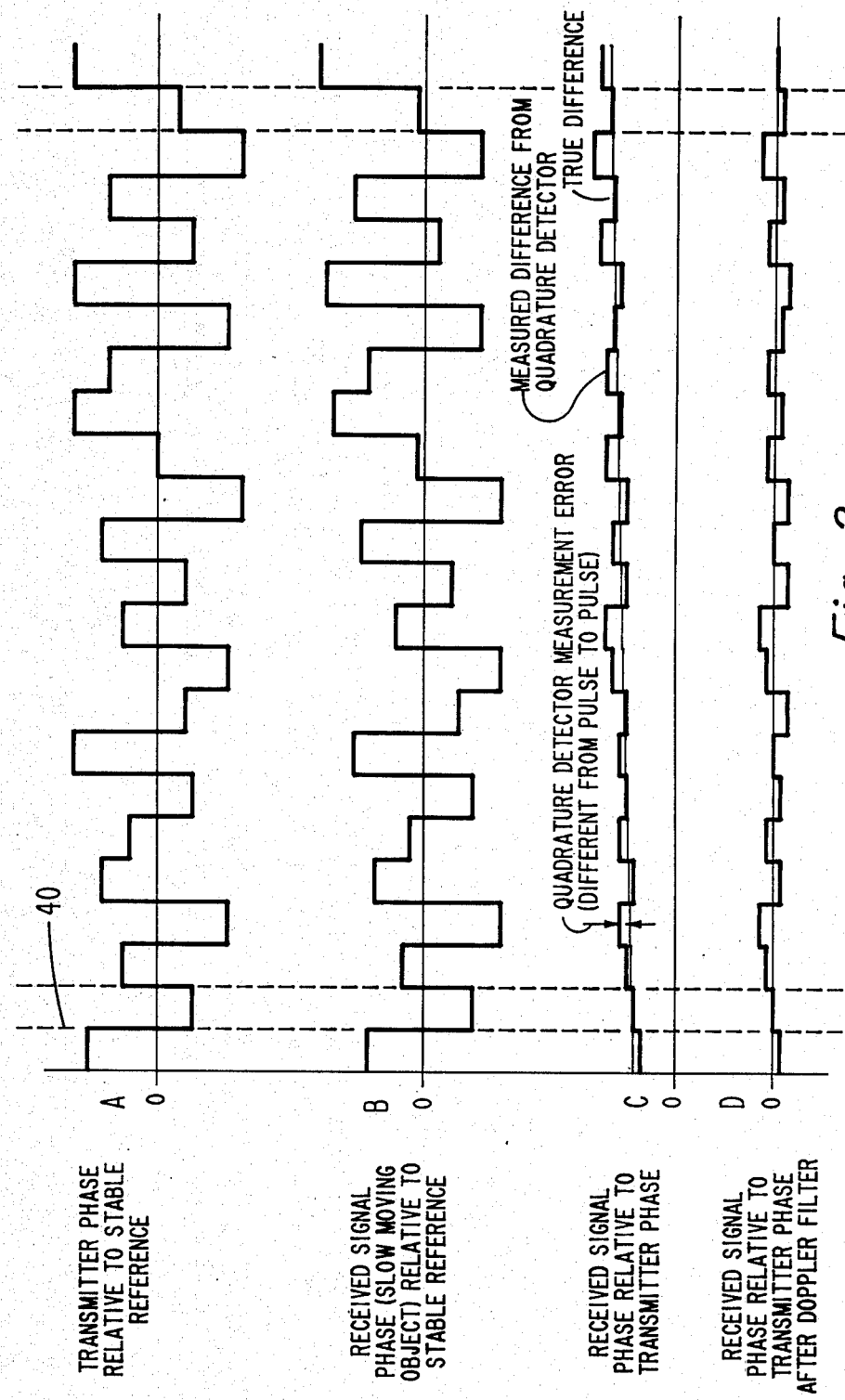
FIG. 2 is a set of waveforms useful in understanding the operation of the prior art coherent-on-receive radar.

With reference now to FIG. 2, each of the waveforms A, B, C amd D of FIG. 2 is plotted as time on the horizontal axis and phase difference on the vertical axis. Only phase changes caused by hardware inaccuracies and slow moving targets (termed clutter) are illustrated in the waveforms of FIG. 2. No signals due to fast moving aircraft are illustrated. Each vertical line such as 40 in FIG. 2 represents the time of transmission of a pulse by antenna 16 (FIG. 1).

The signals represented by the various waveforms are all assumed to be output from a phase difference measuring device, which incorporates a sample and hold circuit, at a given time after each transmit pulse is produced by transmitter 10. Such an actual device having these properties is not illustrated in FIG. 1 but for description purposes one can assume that the waveforms would be the output of I-Q detector 30 after passing through a rectangular to polar coordinate circuit and sample and hold circuit (not shown). Since target range from the radar is proportional to the delay time following each transmitted pulse, the waveform corresponds to the phase of one (sampled) range cell. In actual radar there are many range cells to provide full coverage between the radar's minimum and maximum range.

Operation of the circuit of FIG. 1 will now be given with reference as needed to the waveforms A, B, C and D of FIG. 2. In operation transmitter 10 produces periodic pulses of a preselected microwave frequency which are transmitted by antenna 16 into space to impinge upon both targets of interest, aircraft for example, and targets not of interest (clutter). The phase difference between successive ones of those pulses and the reference oscillator 12 are as illustrated in FIG. 2 waveform A. That is, the phase of successive pulses are quite random relative to one another.

Following a delay $D_1$, after the transmission of each pulse (to prevent electromagnetic interference by the large transmit pulse) a sample of the transmitted pulse and, thus having its phase, is transmitted to mixer 20 to be mixed with the signal from local oscillator 12. The phase difference between the phase of the sample pulse and the phase of oscillator 12 is determined by I-Q detector 30. The phase difference is digitized in A/D converters 32 and 34 and transmitted to the digital processing circuitry (not shown) wherein it is stored and used as described hereinafter. The determination of the sample phase difference from that of the reference signal and transmission to the processing circuitry occurs before any return signals from targets of interest occur.

Return signals received at antenna 16 from impinged targets are mixed in mixer 20 with the frequency produced by local oscillator 12. The mixed signal is compared for phase with the phase of local oscillator 12 signal by I-Q detector 30. The phase difference signal is digitized in A/D converters 32 and 34. FIG. 2 waveform B represents the phase of returned signal in a single range cell related to returns from a small distance range at some exemplary preselected distance in front of antenna 16 relative to the phase of local oscillator 12. The phase at antenna 16 of the return signal relative to the phase of the signal transmitted by antenna 16 ideally changes only as a result of changes in the radial distance of the targets which cause the return signals. In reality there are also phase differences due to hardware inaccuracies.

The processing circuitry subtracts the stored phase difference resulting from the sample pulse transmitted through delay $D_1$, from the phase of each return signal thus producing theoretically the phase difference between the transmitted and return pulses. In reality due to the I-Q detection, the digitization process and other hardware inaccuracies there are significant errors of the actual phase difference between transmitted and received pulses relative to the true difference of the two. Refer now to FIG. 2C.

FIG. 2 waveform C is actually two superimposed waveforms, the first a random stair-step type waveform, and the second a slowly changing stair-step line. (The boundaries of the slowly changing steps are obscured by the random steps.) The continuous line represents the theoretical phase difference between the transmitted and received signals due to a slow moving target, that is, a slowly differing phase with time. The random stair-step waveform represents the actual measured phase difference between the phase of the transmitted pulse phase and received pulse phase. Again it will be remembered that all the waveforms in FIG. 2 due to a return signal are those related to a slow moving target.

With a slow moving target the actual difference in phase of succeeding pulses should vary only slowly and uniformly assuming a constant speed slow moving target. In fact, due to hardware errors particularly errors in generating phase related signals of I-Q detector 30 as a function of phase difference between the two signals applied thereto, there is a considerable pulse to pulse phase variation in the difference of the transmitted and received signals as indicated by the random stair-step portion of waveform FIG. 2C.

FIG. 2D illustrates the result of the signal having passed through doppler filter 36. This is, the slightly changing phase with time as illustrated in FIG. 2C has beem eliminated in FIG. 2D but the stair-step high frequency error component caused by errors in I-Q detector 30 and other hardware is still present. Furthermore, the amplitude, although not illustrated in FIG. 2 is greater than that of the desired signal components due to faster moving targets of interest.

Figure 3:
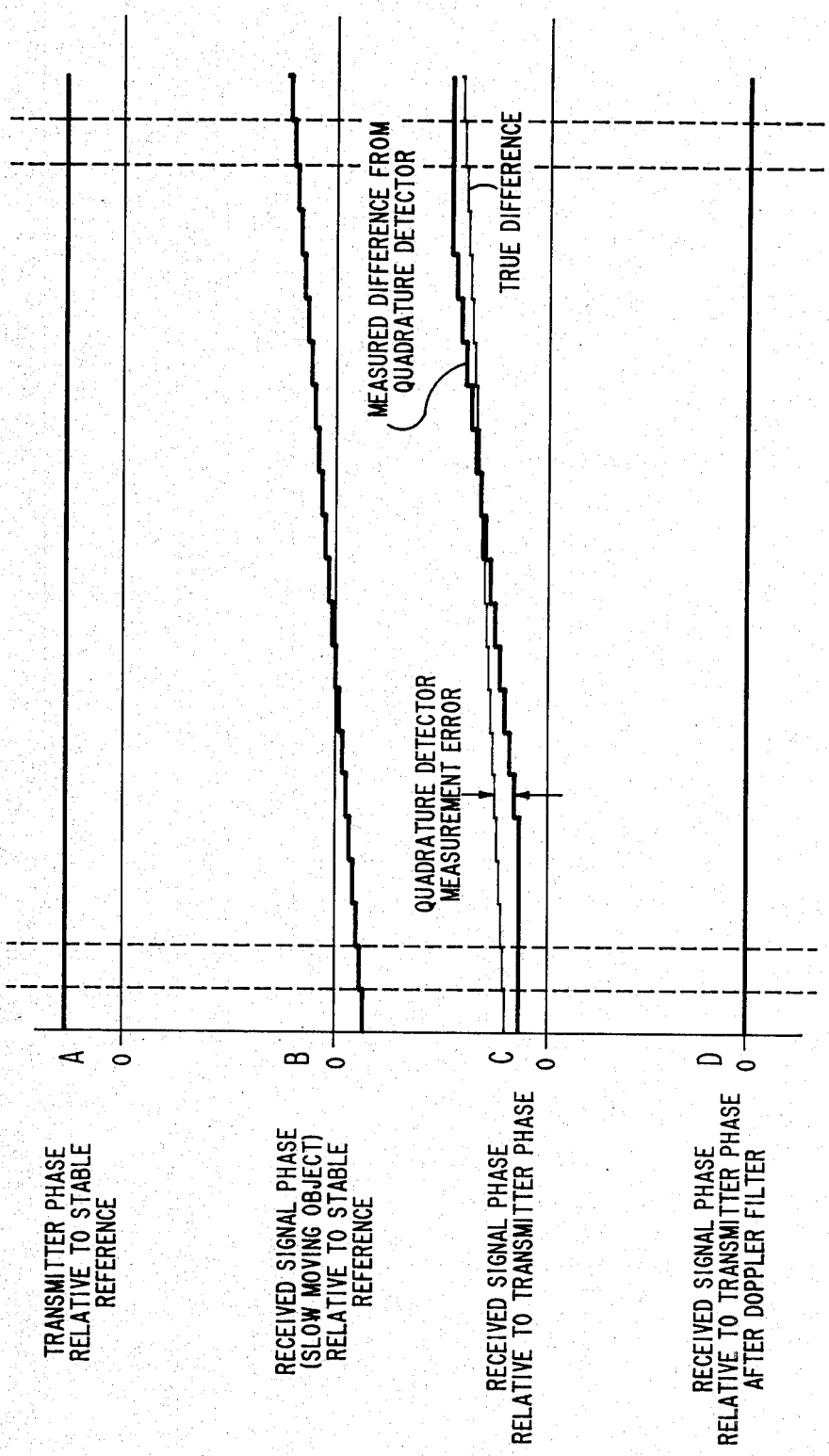
FIG. 3 is a set of waveforms useful in understanding the operation of a fully coherent radar.

The waveforms of FIG. 2 are in contrast to waveforms representative of a fully coherent system as illustrated in FIG. 3. It is instructive to look at the waveforms of FIG. 3 because those waveforms are what is desired to be created by the inventive coherent-on-receive system.

Again, as with FIG. 2 it will be understood that FIG. 3 represents only components of the received signal corresponding to slow moving objects. Components of the received signal corresponding to fast moving objects are not illustrated in FIG. 3. FIG. 3A represents the phase of the transmitted pulse relative to a stable reference frequency because the transmitter in a coherent system is coherent there is no pulse to pulse phase variation. Again it is understood that waveform 3A is modified from the actual transmit pulse in that there is an assumed sample and hold circuit, the output of which is being viewed in FIG. 3A. FIG. 3B represents the phase of the return signal due to a slow moving object relative to a stable reference frequency. Note that the stair-step pattern in FIG. 3B is very uniform simply changing in frequency as a direct function of the speed of the particular target being depicted. Understand that if a faster moving target were being depicted, the waveform would look similar, the only change being that the change in phase from step to step would be greater.

FIG. 3C is two co-extending waveforms as with FIG. 2B, one illustrating the true phase difference between the transmitted signal and the return signal due to a slow moving object and the other waveform is the measured difference having passed through a quadrature detector such as I-Q detector 30 in FIG. 1. It will be noted that the true difference is simply a uniformly increasing stair-step waveform similar to that illustrated in FIG. 3B whereas the measured difference is also increasing in stair-step fashion but looks like a low frequency wave about the true difference signal. This difference is due to the fact that the error of a quadrature detector is a function of phase.

Finally, FIG. 3D is the result of the signal having passed through a doppler filter. It should be noted that since the measured signal as illustrated in FIG. 3C has only low frequency components, a signal having passed through a doppler filter, which filters out signal components due to slow moving targets, is of zero phase difference relative to the reference oscillator. Once again, it will be understood that what is being illustrated is the phase changes of a return signal due to a slow moving target. If there are fast moving targets such as aircraft, the phase change due to these targets would be great and would not be filtered out by a filter such as doppler filter 36 FIG. 1. Thus, those signals due to fast moving objects would then be easily processed by the processing circuitry associated with the coherent system. The net result is that measurement errors on clutter signals being low frequency in the fully coherent system are heavily suppressed by the doppler filter. This is not the case in the coherent on receive system and signal components due to measurement errors on clutter signals are not highly suppressed.

Figure 4:
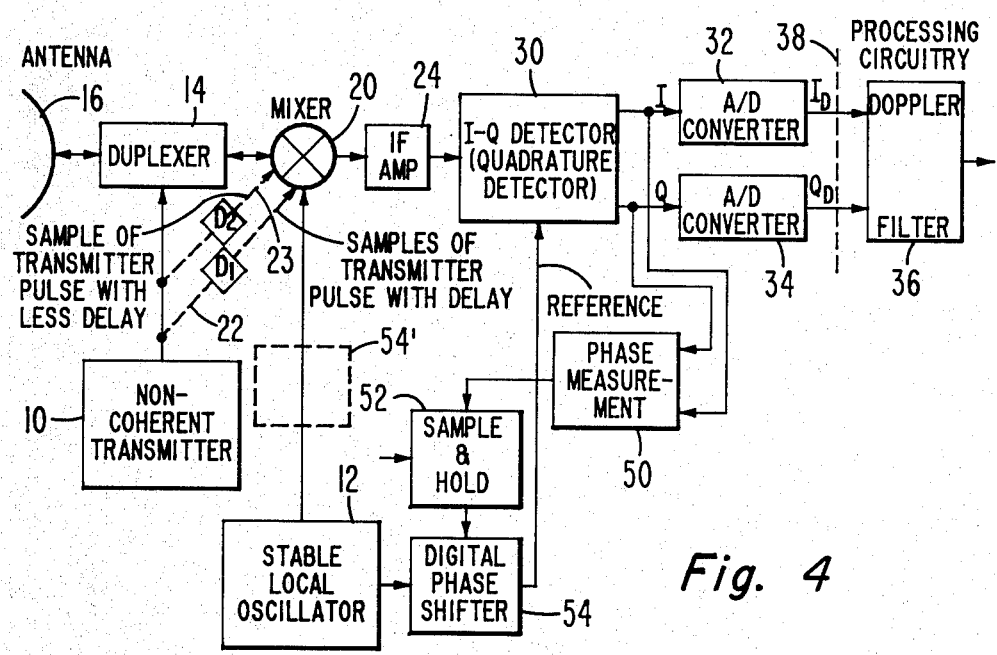
FIG. 4 is a coherent-on-receive radar in block diagram form in accordance with a preferred embodiment of the present invention.

FIG. 4 to which attention is now directed is, like the radar of FIG. 1, a coherent-on-receive radar, has the same components as the radar of FIG. 1 and, with one exception (to be described hereinafter), has the components arranged exactly as the radar of FIG. 1. Components which are the same in FIGS. 1 and 4 are identically numbered in the two figures. The radar of FIG. 4 has additional components not shown in the FIG. 1 radar.

In addition to the sample of the transmitted signal transferred to mixer 20 along dashed line 22 an additional sample of the transmitter pulse is also sent along dashed line 23 to mixer 20. The delay $D_2$ is less than the delay $D_1$ in line 22 but still meets the criteria set forth for delay $D_1$, that is, that the pulse arrives at mixer 20 after the pulse produced by transmitter 10 ceases and before any return from targets of interest are received at antenna 16.

The I and Q outputs of quadrature detector 30 are coupled to the input of a phase measuring device 50. Phase measuring device 50 essentially does the computation arctan $(Q \div I)$ and produces a signal at its output which represents the phase difference of signals input to I-Q detector 30. The output of phase measurement device 50 is coupled to sample and hold circuit 52. The sample and hold circuit 52 also receives at its clock (C) input a signal the origin of which is not shown but occurs during the time that the sample pulse from transmitter 10 via line 23 is being transmitted.

The output of sample and hold circuit 52 is used to control the amount of phase shift in a phase shifter circuit 54. Phase shifter circuit 54 is typically a digital phase shifter for ease in implementation. Phase shifter circuit 54 is connected in the path between local oscillator 12 and the control input of I-Q detector 30. This is the one difference in the connection from the circuit of FIG. 1 where the local oscillator is connected directly to the control input of I-Q detector 30.

As will become more evident hereinafter phase shifter 54 may be placed anywhere in the circular path comprising oscillator 12, mixer 20, IF amplifier 24 and I-Q detector 30. Thus, phase shifter 54 may be positioned between oscillator 12 and mixer 20, between mixer 20 and IF amplifier 24 or between IF amplifier 24 and I-Q detector 30. One such alternative position, that between oscillator 12 and mixer 10 is illustrated by dashed lines 54'. The illustrated location of phase shifter 54 has practical advantages in that the shifted signal is at IF (not microwave) frequency and has a constant amplitude.

Figure 5:
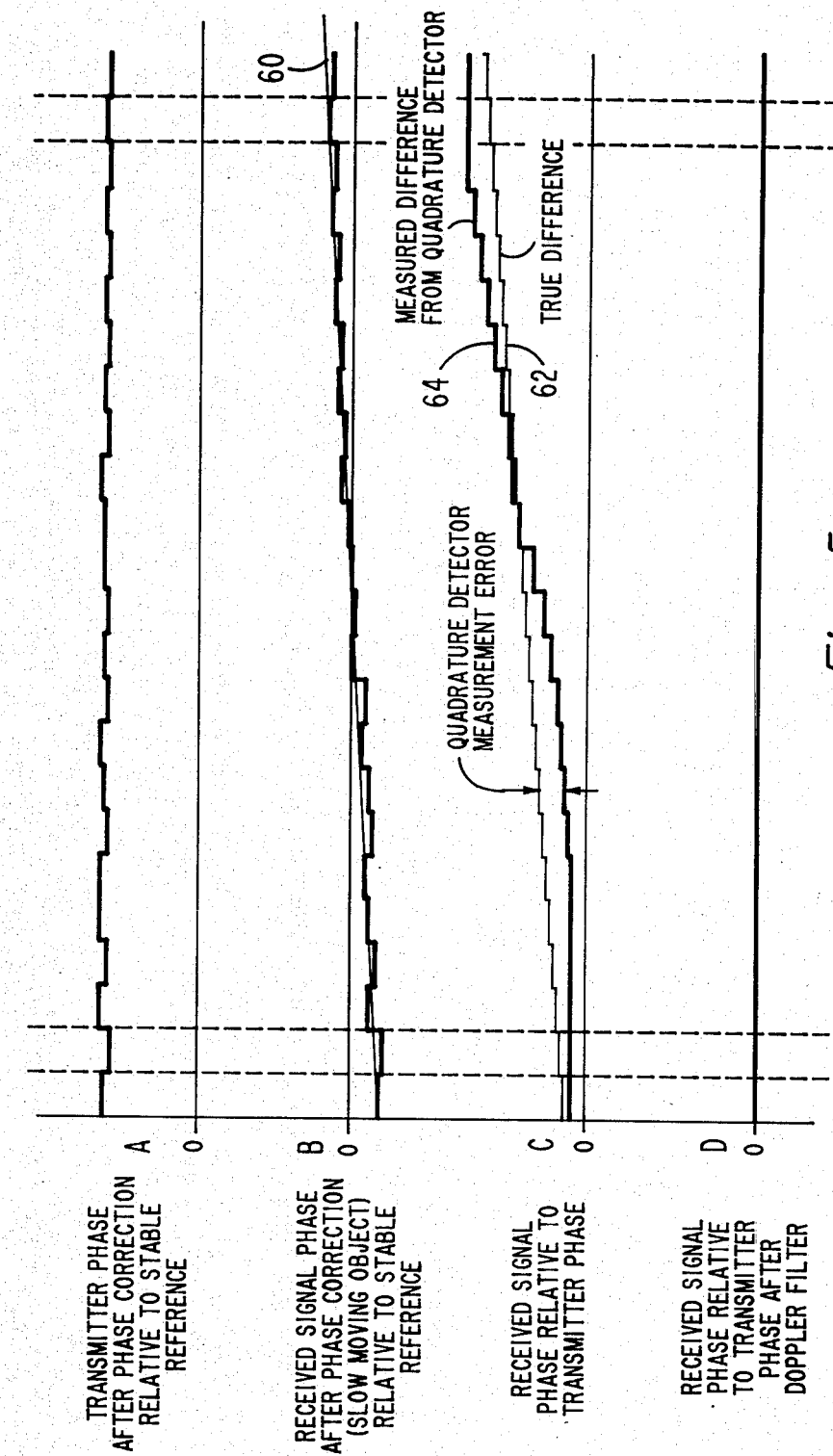
FIG. 5 is a set of waveforms useful in understanding the operation of the coherent-on-receive radar of FIG. 4.

Operation of the inventive circuit of FIG. 4 will be described using only FIG. 4 first and then described in connection with the waveforms of FIG. 5 illustrating the operation of the FIG. 4 circuit. A pulse of some unknown phase relative to that of the local oscillator 12 is produced by transmitter 10 and transmitted via antenna 16 into space to impinge targets in its path. A short time later (five microseconds by way of example) a sample of the transmitted pulse is passed to mixer 20 where it is mixed with the local oscillator signal to produce an intermediate frequency signal. At that time phase shift circuit 54 is set to zero (or any arbitrary) phase shift. Thus, I-Q detector 30 receives at its reference input a signal representing the phase of the local oscillator 12 signal.

Therefore, five microseconds after the transmission of a pulse from transmitter 10, I-Q detector 30 is receiving two signals, one corresponding to the phase of the transmitted signal and one corresponding to the phase of the local oscillator signal. In response to the two signals, I-Q detector 30 produces at its output rectangular coordinate signals (i.e., in phase and quadrature signals) representing the phase difference between the two input signals.

Phase measurement device 50 converts the rectangular coordinate signals to a polar coordinate signal which is sampled and held by sample and hold circuit 52. The held sample causes phase shift circuit 54 to shift the phase of a local oscillator signal as applied to I-Q detector 30 by an amount such as to be ideally exactly in phase with the pulse from transmitter 10 which caused the phase shift to occur. In reality the phase shift correction is not perfect due to errors (and discrete levels) in the devices making up the phase shift circuit.

Thereafter when the second delayed pulse, the one passing over path 22 through delay $D_1$, is mixed in mixer 20 and reaches I-Q detector 30, the resulting output signal from I-Q detector 30 will indicate a substantially in-phase relationship between the sampled signal and the phase shifted local oscillator signal. When thereafter a return pulse is received at antenna 16, the indicated phase difference corresponding to the I and Q outputs of I-Q detector 30 will indicate an out-of-phase condition only by an amount representing the speed of movement of the target causing the return pulse, the aforementioned errors in the I-Q detector itself and the slight difference between the actual phase of the transmitted signal and its phase as determined by the output signal from phase shift circuit 54. The same results follow if phase shifter 54 is located elsehwere as previously described.

The various phase differences in the circuit of FIG. 4 are as illustrated in FIG. 5 to which attention is now directed. As with FIGS. 2 and 3, FIG. 5 consists of four waveform segments labeled A, B, C and D with waveform segment C actually comprising two superimposed waveforms. All waveforms are represented by time on the horizontal axis and phase difference relative to local oscillator 12 on the vertical axis. Waveform 5A corresponds to the difference between the phase of the transmitted pulse and the measured phase of the transmitted pulse as indicated by the signal produced by phase shift circuit 54. Therefore, if the measured phase were prefect, waveform 5A would simply be a straight horizontal line (and near zero).

Waveform 5B illustrates the phase difference between the phase of a return signal resulting from impingement on and reflection back to antenna 16 from a slow moving target and the stable reference. There are thus two components making up the phase difference signal as illustrated in waveform 5B. The first smooth sloping component as indicated by an average line 60 is due to the doppler effect caused by movement of the target which causes a uniformly increasing stair-step waveform, the steps being obscured by the illustrated stair-step waveform. The second stair-step type phase difference is due to the error in the phase shift circuit 54. This error is the same as the error in waveform 5A.

Waveform 5C, which is two superimposed waveforms, illustrates in waveform portion 62, the true difference between the transmitted pulse and the return signal from the slow moving target. That is, waveform 60 in FIG. 5B and waveform 62 in FIG. 5C are identical in value except for a possible constant phase offset which will cause no problems. The other waveform in FIG. 5C, that is waveform 64, represents the phase differences measured at the output of I-Q detector 30 relative to that of the transmitted signal. That signal as was true of the waveforms in FIG. 2 and the waveforms in FIG. 3 is in error by an amount dependent on the amount of phase shift measured in I-Q detector 30.

It is important to compare waveform 5C with waveform 2C. It will be noted that in waveform 2C the phase error is a very pronounced random stair-step as a function of the successive transmitted pulses, whereas in FIG. 5C the pulse to pulse variation is slight. Whereas the measured difference waveform in FIG. 2C is difficult or impossible to filter out in a doppler filter such as 36 FIG. 4, the low frequency variation of the waveform illustrated in FIG. 5C is easily filtered out producing no phase difference (or clutter residual) after filtering as illustrated in waveform 5D. Waveform 5D should be compared to waveform 2D and to waveform 3D. Note that in waveform 2D after filtering a considerable phase difference signal related to slow moving targets is still present whereas FIG. 5D IS like FIG. 3D in that the waveform components due to slow moving targets and errors in I-Q detector 30 have been completely eliminated.

In summary, the inventive circuit of FIG. 4 achieves the same clutter cancellation as a fully coherent radar without the added complexity of a fully coherent radar.

What is claimed is:

1. In a coherent-on-receive radar system of the type which includes:
   first means for producing periodic radio frequency (rf) pulses which are not necessarily in phase with one another,
   second means for transmitting the periodic pulses into space and for receiving return pulses reflected from targets (if any) impinged by the transmitted pulses;
   third means for producing an rf reference signal having a reference phase; and
   fourth means responsive to each second means return pulse and third means signal for producing a signal, a parameter of which represents the phase difference between the pulse and signal from the second and third means respectively, the improvement comprising:
   fifth means for providing to said fourth means, at a time following the transmission of each periodic pulse and before any return signals from any targets of interest are received, a signal corresponding to the phase of said transmitted pulse;
   said fourth means being responsive to the signal from said fifth means and third means for determining the difference in phase between the transmitted pulse and reference signal;
   sixth means for storing a signal repesenting said phase difference between said transmitted pulse and reference signal until the next successive transmitted pulse occurs; and seventh means responsive to the stored signal for altering the phase of one of the return signal and reference phase signal as applied to the fourth means whereby said fourth means produces signals representing substantially the phase difference between the transmitted pulse and resulting return signals.

2. The combination as set forth in claim 1 wherein said fourth means comprises means producing in-phase and quadrature signals representing in rectangular coordinates the difference in phase between the phases of the signals supplied thereto.

3. The combination as set forth in claim 2 and further comprising analog-to-digital converters coupled to receive the in-phase and quadrature signals respectively for producing a digitized output corresponding thereto.

4. The combination as set forth in claim 1 wherein said sixth means comprises a sample and hold circuit.

5. The combination as set forth in claim 2 wherein said sixth means comprises means responsive to the in-phase and quadrature signals produced by said fourth means in response to signals concurrently received from said fifth means and third means for producing a single signal representing the phase difference between the two input signals and further comprising a sample and hold circuit responsive to said single signal for storing a signal representing the phase difference.

6. The combination as set forth in claim 1 wherein said seventh means comprises means for altering the reference signal as applied to said fourth means.

7. The combination as set forth in claim 1 wherein said seventh means comprises means for altering the return signal as applied to the fourth means.

8. The combination as set forth in claim 1 wherein said seventh means comprises a phase shifter circuit.

9. The combination as set forth in claim 8 wherein said seventh means comprises means for altering the reference signal as applied to said fourth means.

10. The combination as set forth in claim 8 wherein said seventh means comprises means for altering the return signal as applied to the fourth means.

11. In a coherent-on-receive radar system of the type which includes
a non-coherent transmitter for producing periodic radio frequency (rf) pulses which are not necessarily in phase with one another,
means for transmitting the periodic pulses into space and for receiving return pulses reflected from targets (if any) impinged by the transmitted pulses;
a local oscillator for producing an rf reference signal having a reference phase; and
a phase detector responsive to each second means return pulse and the local oscillator signal for producing a signal, a parameter of which represents the phase difference between the pulse and reference signal, the improvement comprising:
means for providing to said phase detector at a time following the transmission of each periodic pulse and before any return signals from any targets of interest are received, a signal corresponding to the phase of said transmitted pulse;
said phase detector being responsive to the reference signal and signal corresponding to the phase of the transmitted pulse for determining the difference in phase between the transmitted pulse and reference signal;
a means for storing a signal representing said phase difference between said transmitted pulse and reference signal until the next successive transmitted pulse occurs; and
a phase shifter responsive to the stored signal for altering the phase of one of the return signal and reference phase signal as applied to the phase detector whereby said phase detector produces signals representing substantially the phase difference between the transmitted pulse and resulting return signals.

12. The combination as set forth in claim 11 wherein said phase shifter comprises means for altering the phase of the reference signal as applied to said fourth means.

13. The combination as set forth in claim 11 wherein said phase shifter comprises means for altering the phase of the return signal as applied to the fourth means.

* * * * *